United States Patent [19]
Yoshida

[11] Patent Number: 6,047,985
[45] Date of Patent: Apr. 11, 2000

[54] OCCUPANT PROTECTIVE DEVICE

[75] Inventor: Ryoichi Yoshida, Shiga, Japan

[73] Assignee: Takata Corporation, Tokyo, Japan

[21] Appl. No.: 09/146,099

[22] Filed: Sep. 3, 1998

[30] Foreign Application Priority Data

Sep. 8, 1997 [JP] Japan .................................. 9-242599

[51] Int. Cl.⁷ .................................................. B60R 21/26
[52] U.S. Cl. ................................................... 280/735
[58] Field of Search ............................................ 280/735

[56] References Cited

U.S. PATENT DOCUMENTS

| | | | |
|---|---|---|---|
| 5,573,269 | 11/1996 | Gentry et al. | 280/735 |
| 5,613,702 | 3/1997 | Goetz | 280/735 |
| 5,673,932 | 10/1997 | Nitschke et al. | 280/735 |
| 5,790,404 | 8/1998 | Faye et al. | 280/735 |

*Primary Examiner*—Kenneth R. Rice
*Attorney, Agent, or Firm*—Kanesaka & Takeuchi

[57] ABSTRACT

An occupant protective device, which can precisely determine clash severity of a vehicle collision and suitably protect an occupant according to the clash severity, detects acceleration by an acceleration sensor 1, finds the acceleration, the magnitude of the acceleration, the variation with time of the acceleration, and the decrease in velocity in a control circuit 2, determines clash severity, and actuates inflators 3a, 3b according to the clash severity.

14 Claims, 4 Drawing Sheets

OCCUPANT PROTECTIVE DEVICE

FIELD OF THE INVENTION

The present invention relates to an occupant protective device for protecting an occupant in a collision and, more particularly, to an occupant protective device for protecting an occupant with an air bag device. In detail, the present invention relates to an occupant protective device in which the amount of gas for deploying an air bag is controlled corresponding to the severity of a vehicle collision.

DESCRIPTION OF PRIOR ART

U.S. Pat. No. 4,243,248 to Scholtz et al discloses an air bag device having two inflators which are actuated in a collision with time delay to inflate an air bag in two stages, whereby the ear drums of an occupant can be protected from rapid increase in the inner pressure of cabin.

FIG. 4 is a schematic diagram of the air bag device of U.S. Pat. '248. The air bag device includes clash severity detecting means 7, 8 having two acceleration detectors $B_1$, $B_2$ and determination units $S_1$, $S_2$. Threshold values $S_1$, $S_2$ ($S_1 < S_2$) are set in the determination units $S_1$, $S_2$, respectively. The clash severity is calculated using acceleration detected by the acceleration detector $B_1$ or $B_2$. When the clash severity exceeds the threshold values $S_1$, $S_2$, ignition signals are output from the clash severity detecting means 7, 8. The signal from the clash severity detecting means 7 is output to an ignitor 12 through a time-lag circuit 9.

When the clash severity detected by the acceleration detector $B_1$ is less than $S_1$, no signal is output from the clash severity detecting means 7, 8. When the clash severity detected by the acceleration detector $B_1$ reaches $S_1$, the clash severity detecting means 7 output a signal so that an ignitor 11 ignites a first chamber 14 of a gas generator 34 to generate 80 liters of gas for inflating an air bag 22 associated with a front-seat passenger (hereinafter, referred to as "passenger air bag") in a smaller configuration as shown by a broken line 22'.

When the clash severity detected by the acceleration detector $B_2$ reaches $S_2$, the clash severity detecting means 8 also output a signal. After a predetermined period $T_1$ elapses from a moment when the means 7 output the signal, the signal from the means 7 is input into the ignitor 12. In case that, at this time, the signal from the means 8 is also input into the ignitor 12, the ignitor 12 ignites a second chamber 16 of the gas generator 34 and a gas generator 33 of an air bag 21 associated with a driver (hereinafter, referred to as "driver air bag") to generate 70 liters of gas from the second chamber 16 into the air bag 22 and generate 60 liters of gas into the air bag 21.

In the clash severity detecting means 7, 8, outputs (decelerations) from two acceleration detectors $B_1$, $B_2$ are integrated with times, values indicating progress of increase in deceleration with time are obtained in such a manner that the values are directly proportional to the integral values $°b(t)dt$ of decelerations $b(t)$, and the obtained values are compared to the threshold values $S_1$, $S_2$.

The air bag device of U.S. Pat. '248 prevents the driver air bag 21 and the passenger air bag 22 from inflating at once not to affect the ear drams of the occupant. The device has no technical effect of protecting the occupant by inflating the air bags suitably corresponding to the clash severity. That is, the device uses decelerations of the vehicle as a timer for timing ignition of two gas generators with time difference and does not provide technology of corresponding the occupant protection by the air bags to the severity of the clash or the impact.

OBJECT AND SUMMARY OF THE INVENTION

It is an object of the present invention to provide an occupant protective device which can suitably protect an occupant according to the severity of a clash or an impact.

An occupant protective device of a first aspect comprises: clash severity determining means having an acceleration sensor and determining the clash severity of a vehicle collision based on outputs of the sensor; gas generating means which are actuated by a signal from the clash severity determining means; and an air bag which is deployed with gas from the gas generating means, wherein the gas generating means allow the change of the amount of gas to be generated. The clash severity determining means categorize the clash severity into at least three scales, i.e. small, medium, and large. When the clash severity is small, the gas generating means are not actuated, and only when the clash severity is medium or large, the gas generating means are actuated such that the larger the clash severity, the larger the amount of gas to be generated.

In the first aspect, as the clash severity is determined as not small, the gas generating means are partially actuated immediately to inflate the air bag softly and then the scale of the clash severity is further determined. When, as a result, the clash severity is determined as larger than medium (i.e. large), the gas generating means are further actuated. This allows plenty of time to be taken for determining that the clash severity is large. Therefore, the inner pressure of the air bag can be sufficiently increased earlier than a case that the gas generating means are actuated for the first time when the clash severity is determined as large.

When the clash severity is determined as medium, the inner pressure of the air bag is lower than that of the large-scale collision so that the air bag is deployed softly. Therefore, reaction applied to the occupant when plunging into the air bag softly deployed is relatively small. When the clash severity is large, the inner pressure of the air bag is sufficiently high, thereby securely preventing the body of the occupant from directly colliding with a vehicle body member (for example, a steering, an instrument panel, and a windshield) even when the occupant plunges into the air bag at a high speed.

An occupant protective device of an second aspect comprises: clash severity determining means having an acceleration sensor and determining the clash severity of a vehicle collision based on outputs of the sensor; gas generating means which are actuated by a signal from the clash severity determining means; and an air bag which is deployed with gas from the gas generating means, wherein the gas generating means is capable of generating gas in multiple stages. The clash severity determining means categorize the clash severity into at least three scales, i.e. small, medium, and large. When the clash severity is small, the gas generating means are not actuated, and only when the clash severity is medium or large, the gas generating means are actuated such that the larger the clash severity, the earlier the gas generating means generate gas in the second stage or more.

In the second aspect, as the clash severity is determined as not small, the gas generating means are partially actuated immediately to inflate the air bag softly and then the scale of the clash severity is further determined. When, as a result, the clash severity is determined as large, the gas generating means are further actuated after an elapse of a time period $t_1$. When the clash severity is determined as medium, the gas generating means are further actuated after an elapse of a time period $t_2$ ($t_2 > t_1$).

In the second aspect, the air bag is inflated slowly when the clash severity is medium and is inflated rapidly when the clash severity is large.

According to the present invention, the clash severity may be determined on the basis of, at least, the magnitude of acceleration, the variation with time of acceleration, and the decrease in velocity.

According to the present invention, it is preferable that a threshold value used for determining whether the clash severity is small or medium is a value when a vehicle collides against a barrier at a speed selected from a range between 12.8 km/h and 22.4 km/h (8–14 mph). It is preferable that a threshold value used for determining whether the clash severity is medium or large is a value when a vehicle collides against a barrier at a speed selected from a range between 25.6 km/h and 35.2 km/h (16–22 mph). However, these values are not limited thereto.

It should be noted that the barrier is a solid wall made of concrete.

PREFERRED EMBODIMENTS

Figure 1A:
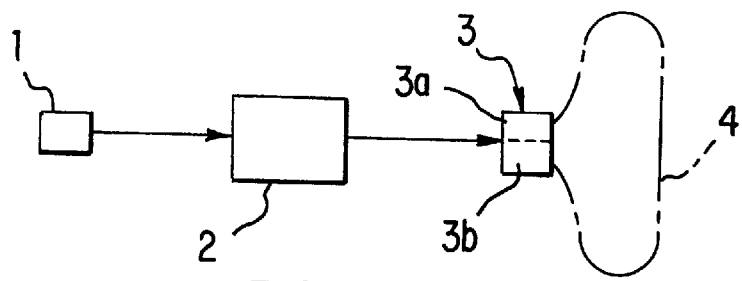
FIG. 1a is a block diagram illustrating an embodiment.
Figure 1B:
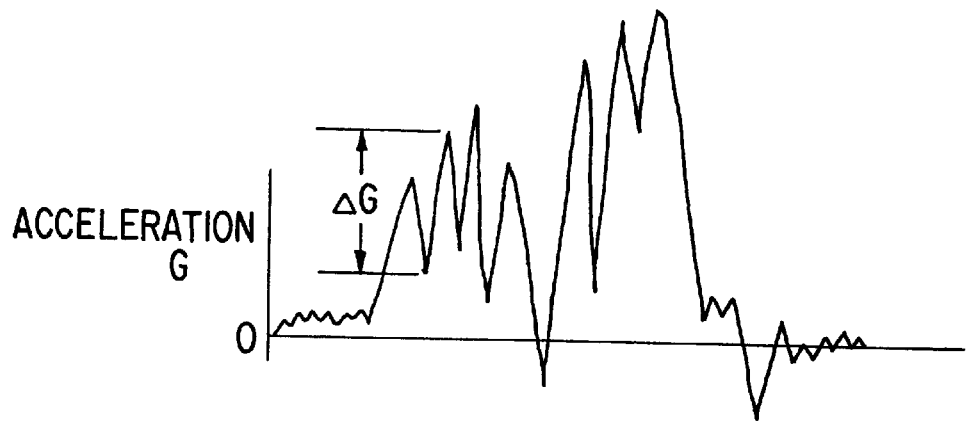
FIGS. 1b and 1c show variations in acceleration or velocity in a collision.
Figure 1C:
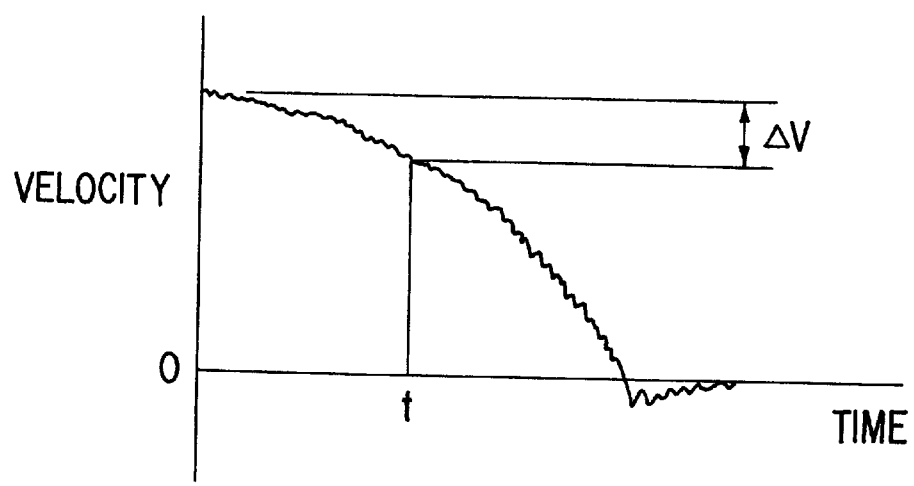

FIG. 1a is a block diagram of an occupant protective device according to an embodiment, FIGS. 1b and 1c are graphs showing wave forms of acceleration and velocity.

The occupant protective device comprises one acceleration sensor 1, a control circuit 2 into which an acceleration signal output from the acceleration sensor 1 is input, inflator means 3 actuated by the control circuit 2, and an air bag 4 inflated with gas from the inflator means 3. The air bag 4 may be either a driver air bag or a passenger air bag.

The inflator means 3 consist of two inflators, i.e. a first inflator 3a and a second inflator 3b. The inflator means 3 may consist of three inflators or more, or consist of one inflator which can control the amount of gas to be generated. When the inflator means 3 consist of a plurality of inflators, each inflator has capacity differing from each other and the sequence of ignition of the inflators each having different capacity is suitably selected, whereby the speed of deploying the air bag can be elaborately selected.

Acceleration G is generated when the vehicle comes into collision and acceleration signals schematically shown in FIG. 1b are output from the acceleration sensor 1. Velocity is found by integrating the acceleration G with time, variations of velocity are shown in the graph of variations with time of FIG. 1c. The acceleration G violently varies with time as shown in FIG. 1a. Accordingly, the velocity V found by integrating the acceleration G with time decreases to 0 (the vehicle stops) along with a minute wave.

By the way, the wave form of acceleration signals differs depending on the collision condition such as a head-on collision against a barrier, a collision against a pole, and an offset collision. The acceleration signals also differ in such cases that the vehicle runs on a rough road at a high speed and that the vehicle runs up on a curbstone. In these cases, even when a significant wave form is formed, the inflator means must not be actuated to develop the air bag. Therefore, based on the wave form of the acceleration signals output from the acceleration sensor 1, whether the air bag must be deployed or must not be deployed should be judged. When it is judged that the air bag must be deployed, whether the air bag must be deployed slowly or rapidly should further be judged quickly in consideration of the deployment period of the air bag.

In this embodiment, the clash severity is determined from the magnitude of acceleration G, the variation of acceleration $\Delta G$ (difference of G between a wave bottom and a next wave peak of the acceleration signals), and the decrease in velocity $\Delta V$ (reduction in velocity) (hereinafter, these will be referred to as "parameters for clash severity").

As previous processes for the aforementioned judges, vehicles each of which is provided with the aforementioned occupant protective device are brought into collision against various objects (for example, a barrier as an impact member made of concrete, a pole such as a mast, and a vehicle) at various velocities, and acceleration waves (G waves), just like FIG. 1b, generated at the respective collisions are sampled and stored in a memory of, for example, a computer. In addition, such vehicles are run on the rough road at a high speed, passed on concavity(s) in a road, run on a stone paved road; run up on a curbstone; and the like, and inherent acceleration waves generated in the respective cases are sampled and stored in the memory.

Acceleration waves in cases of offset collisions at various speeds are also stored in the memory.

The signals stored in the memory are given to a computer and the threshold values $G_1$, $G_2$, $\Delta G_1$, $\Delta G_2$, $\Delta V_1$, $\Delta V_2$ with regard to parameters of the clash severity such as the acceleration G, the variation of acceleration $\Delta G$, the decrease in velocity $\Delta V$ until a predetermined time t are changed. That is, various values are applied to $G_1$, $\Delta G_1$, $\Delta V_1$, to simulate collisions and the threshold values $G_1$, $\Delta G_1$, $\Delta V_1$ are determined in such a manner as to meet conditions that G, $\Delta G$, $\Delta V$ do not exceed $G_1$, $\Delta G_1$, $\Delta V_1$, without exception in the following cases of:

collision against the barrier at 8 mph (mph: miles/h);

running on the rough road at high speed;

passage on the concavity in the road;

running on the stone paved road; and running up on the curbstone, and that G, $\Delta G$, $\Delta V$ exceed $G_1$, $\Delta G_1$, $\Delta V_1$, without exception in the following cases of:

collision against the barrier at 12 mph;

collision against the barrier at 18 mph;

collision against the pole at 15 mph;

offset collision at 18 mph;

collision against the barrier at 20 mph;

collision against the barrier at 25 mph;

collision against the barrier at 30 mph;

collision against the barrier at 35 mph; and offset collision at 35 mph.

In the same manner, various values are applied to $G_2$, $\Delta G_2$, $\Delta V_2$ to simulate collisions and the threshold values $G_2$, $\Delta G_2$, $\Delta V_2$ are determined in such a manner as to meet conditions that G, $\Delta G$, $\Delta V$ exceed $G_2$, $\Delta G_2$, $\Delta V_2$ without exception in the following cases of:

collision against the barrier at 20 mph;
collision against the barrier at 25 mph;
colliding against pole at 30 mph; and
offset collision at 35 mph, and that G, ΔG, ΔV do not exceed $G_2$, $ΔG_2$, $ΔV_2$ without exception in the following cases of:

collision against the barrier at 8 mph;
running on the rough road at high speed;
passing on the concavity in the road;
running on the stone paved road;
running up on the curbstone;
collision against the barrier at 12 mph;
collision against the barrier at 18 mph;
colliding against pole at 15 mph; and
offset collision at 18 mph.

As next process, the values $G_1$, $ΔG_1$, $ΔV_1$, obtained above are set in the control circuit 2 as threshold values for distinguishing between a small-scale collision and a relatively large-scale collision. In addition, the values $G_2$, $ΔG_2$, $ΔV_2$ are set in the control circuit 2 as threshold values for distinguishing between a relatively small-scale collision and a large-scale collision.

That is, the control circuit 2 determines whether the clash severity of an actual collision is small, medium, or large on the basis of the threshold values $G_1$, $G_2$, $ΔG_1$, $ΔG_2$, $ΔV_1$, $ΔV_2$ based on the parameters for clash severity G, ΔG, ΔV determined by acceleration signals generated by the actual vehicle collision. In particular, in cases of running on rough road at high speed, passing on the concavity in road, running on the stone paved road, and running up on the curbstone, the clash severity should be determined as small so as not to deploy the air bag.

TABLE 1

Clash Severity: Small

Collision against Barrier at 8 mph
Running on Rough Road at High Speed
Passing on Concavity in Road
Running on Stone Paved Road
Running up on Curbstone
Clash Severity: Medium Collision against Barrier at 12 mph
Collision against Barrier at 18 mph
Colliding against Pole at 15 mph
Offset Collision at 18 mph
Clash Severity: Large Collision against Barrier at 20 mph
Collision against Barrier at 25 mph
Collision against Barrier at 30 mph
Collision against Barrier at 35 mph
Offset Collision at 35 mph When the vehicle provided with the occupant protective device of the present invention comes into collision, runs on a rough road, or runs up on a curbstone, the acceleration sensor 1 outputs signals indicating variations in acceleration as shown in FIG. 1b. The control circuit 2 processes the signals to determine the clash severity.

Figure 2:
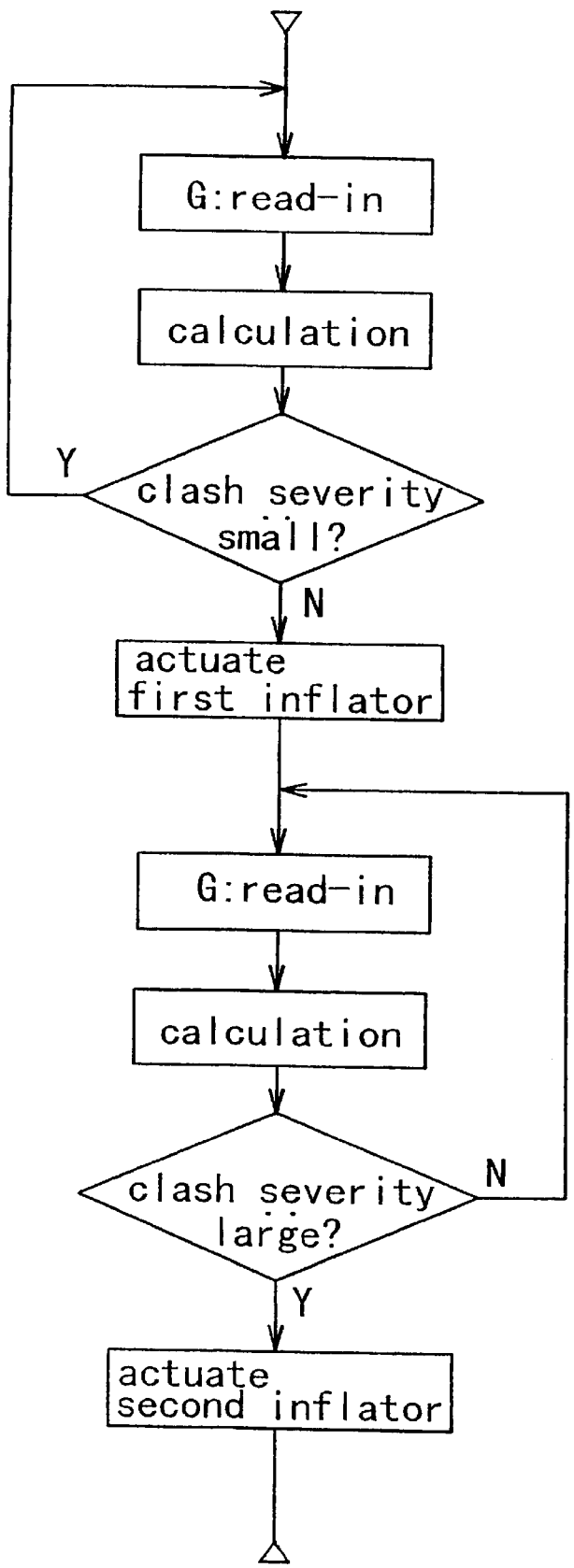
FIG. 2 is a flow chart showing the embodiment.

In an example of control according to a first aspect, as shown in FIG. 2, it is first determined whether the clash severity is small or not. When it is determined that the clash severity is not small (i.e. medium or more), the first inflator 3a is immediately actuated to inflate softly the air bag 4 with a low pressure. After that, the determination is continued. When it is determined that the clash severity is large, the second inflator 3b is actuated to further inflate the air bag 4 in order to sufficiently absorb the impact even when the occupant plunges into the air bag at a high speed.

As shown in FIG. 2, when it is determined that the clash severity is not small, the air bag is partially inflated. When afterward it is determined that the clash severity is large, the air bag is further inflated. In this case, the first determination can be made by just determining whether the air bag should be deployed or not and the determination whether the clash severity is medium or large can be made taking longer time.

The larger the clash severity, the shorter the time (determining time period) required for determining the clash severity from a moment when the vehicle comes into collision (collision starting time). When the clash severity is small, the clash severity can be determined on the basis of the parameters G, ΔG, ΔV during a relatively long period. On the other hand, when the clash severity is larger, it is required to analyze the variations of G, ΔG, ΔV during a shorter period to determine the clash severity.

In case of where the vehicle collides against a barrier at 18 mph, i.e. the clash severity is medium, the determination that the clash severity is larger than that of the low-scale collision can be made on the basis of the parameters G, ΔG, ΔV within a period of, for example, 20–40 milliseconds from the collision starting time. For determining whether the clash severity is medium or large, further analysis of the parameters G, ΔG, ΔV after that is required. In case of where the vehicle collides against a barrier at 25 mph, i.e. the clash severity is large, further analysis of G, ΔG, ΔV is required for determining that the clash severity is large.

In case where large clash severity is detected and the inflator is then actuated, the determination whether the vehicle runs on a rough road or the clash severity is small, medium, or large should be made in a very short period from the collision starting time, or large amounts of gas should be rapidly generated from the inflator, in order to sufficiently deploy the air bag before the occupant plunges into the air bag. Therefore, the inflator should have large capacity and the air bag should be strong for standing the rapid deployment, thereby increasing the cost of the air bag device.

According to the example of the present invention shown in FIG. 2, the air bag is partially inflated in an initial stage when it is detected that the clash severity is not small (i.e. medium or more). Therefore, the air bag can be sufficiently deployed before the occupant plunges into the air bag at a high speed just by generating small amounts of gas slowly from the inflator at a moment when afterward it is detected that the clash severity is large. An inflator having small capacity and an air bag having low strength (for example, fabric strength and stitch tear resistance) may be employed.

According to the example shown in FIG. 2, when the clash severity is medium, the occupant plunges relatively slowly into the air bag which is deployed softly with small amounts of gas so that reaction applied to the occupant by the air bag is relatively small.

Figure 3:
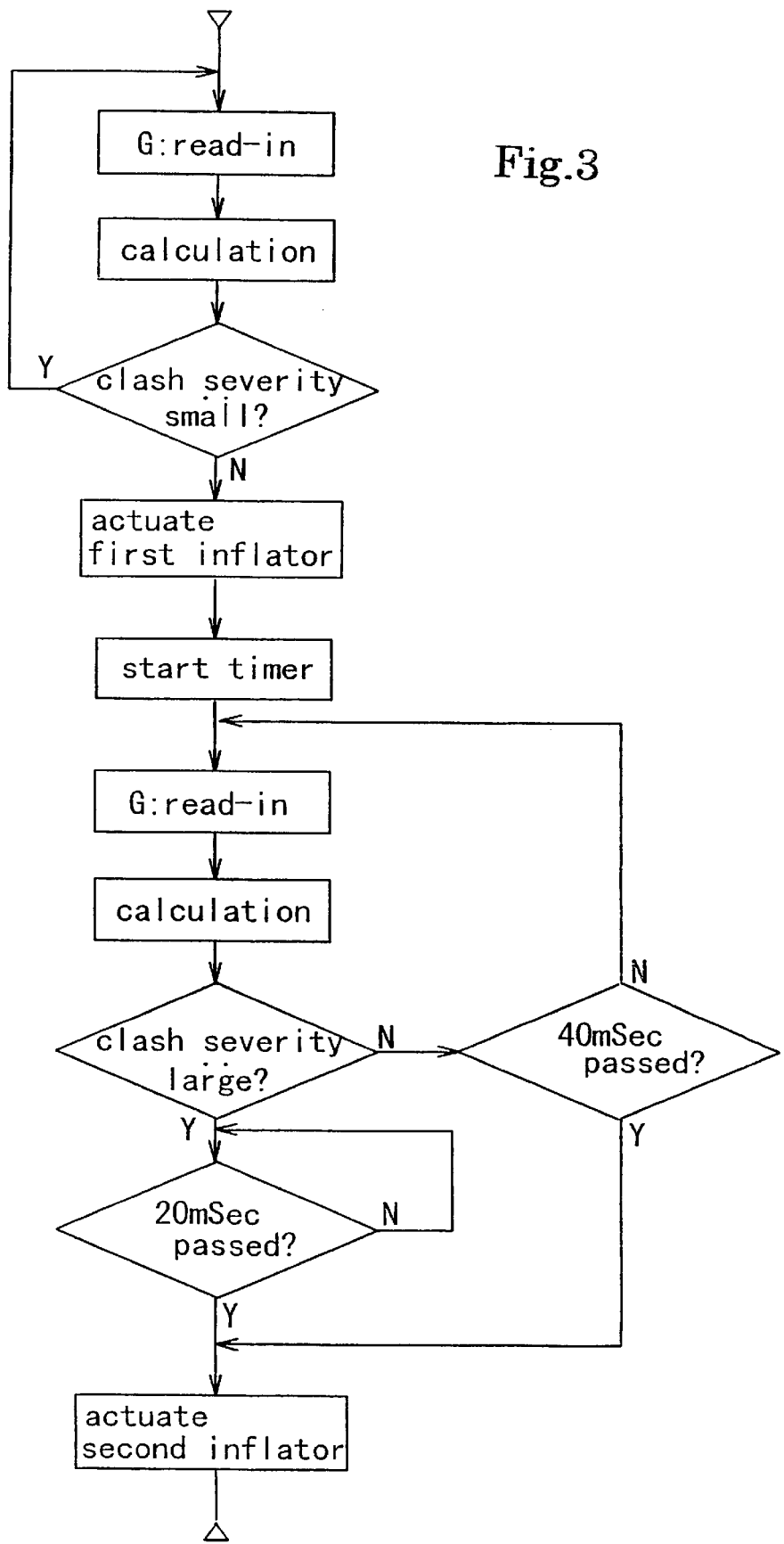
FIG. 3 is a flow chart showing another embodiment.
Figure 4:
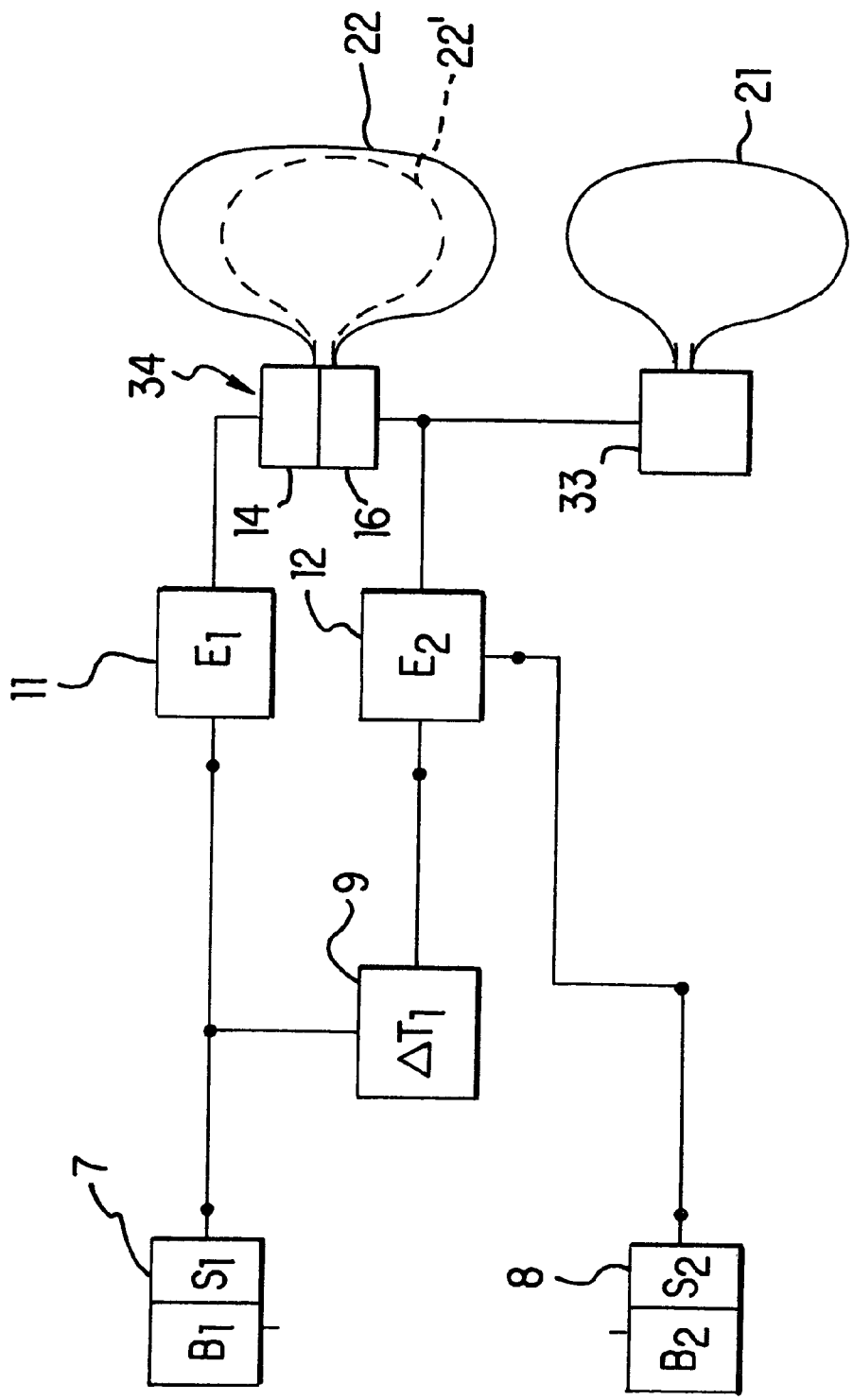
FIG. 4 is a block diagram illustrating a conventional example.

FIG. 3 is a flow chart showing an example of a second aspect.

In FIG. 3, determination whether the clash severity is small or not is made in the same manner as the example of FIG. 2. When it is determined that the clash severity is not small (i.e. medium or more), the first inflator 3a is immediately actuated to inflate the air bag 4 softly with low pressure. Afterward, the determination is continued. When it is determined that the clash severity is large during a period between 10 milliseconds and 30 milliseconds, the second inflator 3b is actuated to further inflate the air bag 4 in order to sufficiently absorb the impact even when the occupant plunges into the air bag at a high speed.

When it is impossible to determine that the clash severity, the second inflator 3b is actuated after an elapse of 40 milliseconds.

Though $t_1$ is set to 20 milliseconds and $t_2$ is set to 40 milliseconds in FIG. 3, it is preferable in case of driver air bag that $t_1$ is 10–30 milliseconds (less than 30 milliseconds) and $t_2$ is 30 milliseconds and more and it is preferable in case of passenger air bag that $t_1$ is 10–30 milliseconds and $t_2$ is 30 milliseconds and more, for example, 30–60 milliseconds or 30–50 milliseconds.

Also in FIG. 3, when it is determined that the clash severity is not small, the air bag is partially inflated. When it is determined that the clash severity is large in a short period after that, the air bag can be further inflated so that the occupant can be sufficiently protected by the air bag even when large impact is applied to the occupant.

The air bag is partially inflated in an initial stage when it is detected that the clash severity is not small (i.e. medium or more). Therefore, the air bag can be sufficiently deployed before the occupant plunges into the air bag at a high speed just by generating small amounts of gas slowly from the inflator at a moment when afterward it is detected that the clash severity is large. An inflator having small capacity and an air bag having low strength (for example, fabric strength and stitch tear resistance) may be employed.

According to the example shown in FIG. 3, when the clash severity is medium, the second inflator 3b is actuated in a later stage, so the air bag is inflated slowly. Therefore, reaction applied to the occupant by the air bag is relatively small.

As mentioned above, the occupant protective device of the present invention can precisely determine clash severity of a vehicle collision and suitably protect an occupant according to the clash severity.

What is claimed is:

1. An occupant protective device comprising:

clash severity determining means having an acceleration sensor and determining the clash severity of a vehicle collision based on outputs of said sensor;

gas generating means which are actuated by a signal from said clash severity determining means and allow the change of the amount of gas to be generated; and an air bag which is deployed with gas from the gas generating means, wherein the clash severity determining means categorize the clash severity into at least three scales, i.e. small, medium, and large, when the clash severity is small, the gas generating means are not actuated, and only when the clash severity is medium or large, the gas generating means are actuated such that the larger the clash severity, the larger the amount of gas to be generated.

2. An occupant protective device as claimed in claim 1, wherein said clash severity determining means first determine whether the clash severity is small or not, and the gas generating means are partially actuated when the clash severity is not small.

3. An occupant protective device as claimed in claim 2, wherein after the gas generating means are partially actuated when the clash severity is determined as not small, said clash severity determining means determine whether the clash severity is large or not, and the gas generating means are further actuated when the clash severity is determined as large.

4. An occupant protective device as claimed in claim 3, wherein only when the clash severity is determined as large within a predetermined period after the clash severity is determined as not small, the gas generating means are further actuated.

5. An occupant protective device as claimed in claim 1, wherein a threshold value used for determining whether the clash severity is small or medium is a value when a vehicle collides against a barrier at a speed selected from a range between 12.8 km/h and 22.4 km/h (8–14 mph).

6. An occupant protective device as claimed in claim 1, wherein a threshold value used for determining whether the clash severity is medium or large is a value when a vehicle collides against a barrier at a speed selected from a range between 25.6 km/h and 35.2 km/h (16–22 mph).

7. An occupant protective device as claimed in claim 1, wherein said clash severity determining means determine the clash severity on the basis of:

the magnitude of acceleration, the variation with time of acceleration, and the decrease in velocity.

8. An occupant protective device comprising:

clash severity determining means having an acceleration sensor and determining the clash severity of a vehicle collision based on outputs of said sensor;

gas generating means which are actuated by a signal from said clash severity determining means and generate gas in multiple stages; and an air bag which is deployed with gas from the gas generating means, wherein the clash severity determining means categorize the clash severity into at least three scales, i.e. small, medium, and large, when the clash severity is small, the gas generating means are not actuated, and only when the clash severity is medium or large, the gas generating means are actuated such that the larger the clash severity, the earlier the gas generating means generate gas in the second stage or more.

9. An occupant protective device as claimed in claim 8, wherein said clash severity determining means first determine whether the clash severity is small or not, and the gas generating means are partially actuated when the clash severity is not small, and wherein afterward, said clash severity determining means determine whether the clash severity is medium or large, the gas generating means are further actuated after an elapse of a time period $t_1$ when the clash severity is determined as large, or the gas generating means are further actuated after an elapse of a time period $t_2$ ($t_2 > t_1$) when the clash severity is determined as medium.

10. An occupant protective device as claimed in claim 9, wherein the occupant protective device is associated with a driver and wherein $t_1$ is selected from a range between 10 and 30 milliseconds and $t_2$ is 30 milliseconds or more.

11. An occupant protective device as claimed in claim 9, wherein the occupant protective device is associated with a front-seat passenger and wherein $t_1$ is selected from a range between 10 and 30 milliseconds and $t_2$ is 30 milliseconds or more.

12. An occupant protective device as claimed in claim 8, wherein a threshold value used for determining whether the clash severity is small or medium is a value when a vehicle collides against a barrier at a speed selected from a range between 12.8 km/h and 22.4 km/h (8–14 mph).

13. An occupant protective device as claimed in claim 8, wherein a threshold value used for determining whether the clash severity is medium or large is a value when a vehicle collides against a barrier at a speed selected from a range between 25.6 km/h and 35.2 km/h (16–22 mph).

14. An occupant protective device as claimed in claim 8, wherein said clash severity determining means determine the clash severity on the basis of:

the magnitude of acceleration,
the variation with time of acceleration, and
the decrease in velocity.

* * * * *